United States Patent
Zhu et al.

(10) Patent No.: US 10,233,510 B2
(45) Date of Patent: Mar. 19, 2019

(54) SYSTEM AND METHOD FOR FLUIDIZED BED REDUCTION OF POWDERED IRON ORE

(71) Applicants: INSTITUTE OF PROCESS ENGINEERING, CHINESE ACADEMY OF SCIENCE, Beijing (CN); BEIJING ZHONGKAIHONGDE TECHNOLOGY CO., LTD., Beijing (CN)

(72) Inventors: Qingshan Zhu, Beijing (CN); Chuanlin Fan, Beijing (CN); Hongzhong Li, Beijing (CN); Zhaohui Xie, Beijing (CN); Wenheng Mu, Beijing (CN); Cunhu Wang, Beijing (CN); Xingang Jiao, Beijing (CN)

(73) Assignees: INSTITUTE OF PROCESS ENGINEERING, CHINESE ACADEMY OF SCIENCES, Beijing (CN); BEJING ZHONGKAIHONGDE TECHNOLOGY CO., LTD., Beijing (CN)

( * ) Notice: Subject to any disclaimer, the term of this patent is extended or adjusted under 35 U.S.C. 154(b) by 384 days.

(21) Appl. No.: 15/109,393

(22) PCT Filed: Dec. 30, 2014

(86) PCT No.: PCT/CN2014/095707
§ 371 (c)(1),
(2) Date: Aug. 22, 2016

(87) PCT Pub. No.: WO2015/101304
PCT Pub. Date: Jul. 9, 2015

(65) Prior Publication Data
US 2016/0348197 A1    Dec. 1, 2016

(30) Foreign Application Priority Data

Dec. 31, 2013    (CN) .......................... 2013 1 0750393

(51) Int. Cl.
$C21B\ 13/14$    (2006.01)
$C21B\ 13/00$    (2006.01)
(Continued)

(52) U.S. Cl.
CPC ........ $C21B\ 13/0033$ (2013.01); $C21B\ 13/146$ (2013.01); $F27B\ 15/003$ (2013.01);
(Continued)

(58) Field of Classification Search
None
See application file for complete search history.

(56) References Cited

U.S. PATENT DOCUMENTS 4,420,332 A  *  12/1983  Mori .......................... C01B 3/44
                                                              208/112
5,082,251 A        1/1992  Whipp
(Continued)

FOREIGN PATENT DOCUMENTS

CN        101153349 A        4/2008
CN        101892339 A        11/2010
(Continued)

OTHER PUBLICATIONS

International Search Report for International Application No. PCT/CN2014/095707, dated Apr. 13, 2015.

*Primary Examiner* — George Wyszomierski
(74) *Attorney, Agent, or Firm* — Gokalp Bayramoglu

(57) ABSTRACT

A system for fluidized bed reduction of powdered iron ore. Use of high-gas-velocity processing accelerates iron ore reduction speed and greatly improves the gas-treatment capabilities of a unit-cross-sectional fluidized bed. Use of (Continued)

parallel connections involving reduced coal gas lessens the volume of gas passing through a single-stage fluidized bed. Use of serial/parallel-connection processing involving reduced coal gas increases the coal gas utilization rate. The invention achieves the highly-effective reduction of powdered iron ore in a fluidized bed under near-atmospheric pressure. A reduction method based on the present system is also disclosed.

8 Claims, 1 Drawing Sheet

(51) Int. Cl.
*F27B 15/00* (2006.01)
*F27B 15/10* (2006.01)
*F27B 15/02* (2006.01)
*F27B 15/14* (2006.01)
*F27B 15/18* (2006.01)

(52) U.S. Cl.
CPC .............. *F27B 15/02* (2013.01); *F27B 15/10* (2013.01); *F27B 15/14* (2013.01); *F27B 15/18* (2013.01); *Y02P 10/136* (2015.11); *Y02P 10/216* (2015.11)

(56) References Cited

U.S. PATENT DOCUMENTS

| 6,736,876 | B1* | 5/2004 | Shin | C21B 13/002 266/172 |
| 6,960,238 | B2* | 11/2005 | Kepplinger | B28B 11/245 266/81 |
| 2009/0308204 | A1* | 12/2009 | Kooij | C21B 13/0033 75/449 |

FOREIGN PATENT DOCUMENTS

| CN | 103667571 A | 3/2014 |
| CN | 103695588 A | 4/2014 |
| CN | 103725819 A | 4/2014 |

* cited by examiner

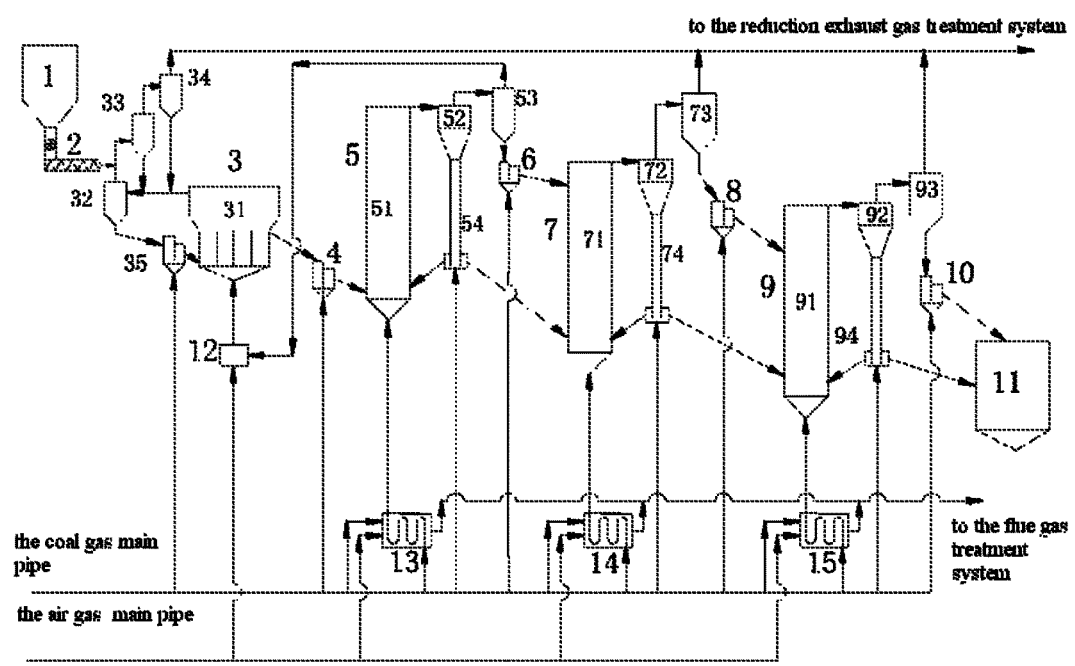

SYSTEM AND METHOD FOR FLUIDIZED BED REDUCTION OF POWDERED IRON ORE

CROSS-REFERENCE TO RELATED APPLICATIONS

The present application is the US National Phase of International Patent Application No. PCT/CN2014/095707, filed Dec. 30, 2014, which claims priority to Chinese Application No. 201310750393.3, filed Dec. 31, 2013, each of which is hereby incorporated by reference in its entirety.

FIELD OF THE INVENTION

The present invention belongs to the fields of chemical engineering and metallurgy, and particularly relates to a system and method for reducing powdery iron ore using a fluidized bed.

BACKGROUND OF THE INVENTION

The current pig-iron smelting mainly employs the blast furnace technology, which requires uses of coke and pellet, involving a relatively long workflow. Non-blast furnace ironmaking technologies have been paid more and more attention for lessening the dependence on coke. Non-blast ironmaking technologies can be divided into two types: direct reduction and melting reduction. The product from direct reduction is sponge iron obtained from the reduction of iron ore concentrate and mainly used as raw material for electric furnace steelmaking. In melting reduction, the sponge iron is further melted so as to obtain liquid iron after separation of slag-iron. Both direct reduction and melting reduction need to undergo a gas-solid phase reduction process of the iron ore concentrate. Their difference mainly lies in the metallization ratio. Direct reduction typically requires a metallization ratio of more than 90%, whereas the metallization ratio for the gas-solid phase reduction (commonly known as pre-reduction) in melting reduction can be as low as 75% due to the presence of subsequent final reduction in a molten bath. The pre-reduction of both direct reduction and melting reduction involves basically the same processes, during which solid iron ore is reduced in a gas phase. Therefore, they are collectively referred to as iron ore reduction in the present application. There are many methods for reducing iron ore, which can be divided into different categories, such as rotary kiln, rotary furnace, shaft furnace, fluidized bed, etc., according to the types of reduction reactors. The fluidized bed reduction reactor is recognized as the most efficient iron ore reduction reactor due to its prominent advantages including direct processing of powdered ore, good heat and mass transfer, high reduction efficiency, etc. compared to other reactors. Reduction of iron ore on a fluidized bed has been investigated for several decades, and a large number of process patent applications have been filed and some technologies such as FIOR/FINMET, FINEX, HISmelt, Circofer, and Circored have undergone pilot scale tests or been industrialized.

The FIOR process was first studied by the ESSO Research and Engineering Company in the 1950s. A 5t/d laboratory-scale trial was completed in ESSO's laboratory (Baton Rouge, La., USA) in 1962, and a 300t/d factory was established in Canada (Darmouth, Nova Scotia) in 1965. In 1976, an industrial plant for producing hot briquettes with an annual output of 400,000 tons (U.S. Pat. Nos. 5,082,251 and 5,192,486) was established in Venezuela, and named as FIOR from the initials of "Fine Iron Ore Reduction". The plant has been putting into operation continuously till today. Having been developing the FINMET technology in cooperation with Voestalpine since 1992, the FIOR Company completed the validation for the FINMET technology in 1995. A FINMET system with an annual output of 500,000 tons began to be established in January 1998, was debugged in November 1999, and was put into operation formally in May 2000. Since 2001, two FINMET systems having each an annual output of 500,000 tons have been merged into a system with an annual output of 1 million tons. $H_2$+CO obtained from natural gas reforming is used as the reducing and fluidizing medium in FIOR/FINMET, in which four stages of fluidized beds are operated in series. The reducing gas with a gas pressure of 11-13 atm (gage pressure) passes through the fourth fluidized bed, the third fluidized bed, the second fluidized bed and the first fluidized bed in series. The unconsumed $H_2$ and CO in reduction exhaust gas are recycled after a purification process such as dust removal, decarbonization, etc. The iron ore powder is reduced on the first fluidized bed, the second fluidized bed, the third fluidized bed and the fourth fluidized bed in series (Schenk, et al., *Particuology*, 2011, 914-23). As there is no intermediary heat supplementation, the temperatures of the fluidized beds are decreased gradually from the fourth fluidized bed with a reduction temperature of about 800° C. to the first fluidized bed with a reduction temperature of only 400-500° C., at which temperature the reduction rate is so low that the first fluidized bed is mainly used for preheating.

The FINEX process is a new melting reduction process based on pre-reduction on a fluidized bed, which was developed by Pohang Iron and Steel Co. Ltd, Korean in cooperation with Voestalpine on the basis of the COREX melting reduction technology of Voestalpine. The technical development of FINEX was started in 1992; a 15t/d laboratory scale-up experiment was completed in 1996; a 150t/d pilot scale test was completed in 1999; a demonstration project with an annual output of 800,000 tons began to be constructed in January 2001, reaching the target output in May 2004; and an industrialized demonstration plant with an annual output of 1500,000 tons was established in May 2007. The pre-reduction part of the FINEX process (U.S. Pat. Nos. 5,762,681, 5,785,733, CN95191907.5, CN95191873.7, US20020166412, US20060119023, US20080302212, and US20080277842), which is basically the same as that of the FIOR/FINMET process, is operated using four-stage fluidized beds in series, except that the clean coal gas obtained through purification of the coal gas generated from melting reduction (in a melting reduction furnace) is used as the reducing and fluidizing medium. The reducing gas with a gas pressure of 2.3-4.0 atm (gage pressure) passes through the fourth fluidized bed, the third fluidized bed, the second fluidized bed and the first fluidized bed in series. The unconsumed $H_2$ and CO in reduction exhaust gas are recycled after purification processes such as dust removal, decarburization, etc. The iron ore powder is reduced while passing through the first fluidized bed, the second fluidized bed, the third fluidized bed and the fourth fluidized bed in series. Like FIOR/FINMET, no separate iron ore powder preheating unit is set up in FINEX. The first fluidized bed mainly serves for drying/preheating at a temperature of about 400° C., and the fourth fluidized bed is at a temperature of 800-900° C. The fluidized bed reduction in the FINEX process has been in operation for years with an annual output of 1500,000 tons (the actual output of reduced iron ore is expected to exceed 2700,000 tons per year).

The Circofer process and Circored process are iron ore reduction processes on coal-based and gas-based fluidized beds, respectively, developed by Lurgi, Germany (Lurgi has sold its metallurgical business to Outokumpu, Finland). In the Circored process (U.S. Pat. No. 5,603,748, and Schenk et al., *Particuology*, 2011, 914-23), hydrogen is used as the reducing medium, and two-stage fluidized beds in series are employed for reduction. First, the iron ore powder is dried and preheated to 850-900° C. in a preheating unit (a combined transferring fluidized bed-cyclone-venturi preheater), and then enters into a circulating fluidized bed at a temperature of 850-900° C. for pre-reduction (first-stage reduction). The pre-reduced iron ore powder discharged from the circulating fluidized bed enters into a bubbling fluidized bed for final reduction (second-stage reduction). The bubbling fluidized bed is a horizontal transverse multi-sectional (multi-staged) fluidized bed with an operational temperature of 630-650° C. The operational pressure of both fluidized beds is 4 atm (gage pressure). The reduced iron ore powder discharged from the bubbling fluidized bed is heated by a rapid heater to a temperature above 680° C. as required for briquetting, and enters into a hot briquetting section for being briquetted. The reduction exhaust gas is recycled after treatments such as exchanging heat with circulating gas for sensible heat recycling, purification, compression, etc. Lurgi began to study the technology of iron ore reduction on circulating fluidized beds in the 1970s, primarily focused on the development of the technology with coal as the reducing medium from 1973 to 1990, and later shifted to research on the reduction technology on fluidized beds with hydrogen as the medium in 1993. In 1996, the company began to establish a demonstration project with an annual output of 500,000 tons in its plant in Trinidad, the construction of which was completed in March 1999. In May 1999, the first batch of hot briquetted iron was obtained. From 1999 to 2001, the system was debugged, optimized and restructured. In August 2001, a targeted goal of 63.6t/h of HBI was successfully achieved. From August to November in 2001, about 130,000 tons of HBI was produced continuously. However, the system has been shut down for market reasons since November 2001. The Circofer process (US20070256519, CN100587080C, and CN100540698C) is a coal-based fluidized reduction process of iron ore developed by the Lurgi/Outokumpu company (Orth, et al., *Minerals Engineering*, 2007, 854-861). In this process, the iron ore powder exchanges heat with the exhaust gas discharged from the first fluidized bed in a combined cyclone-venturi heater. After being preheated, the iron ore powder enters into the front chamber of the first fluidized bed; meanwhile, coal powder is added and oxygen is introduced into the front chamber. The iron ore powder is preheated by the heat generated from partial combustion of the coal powder, during which reductive gas is generated at the same time. The preheated iron ore powder and the generated gas enter into the main bed of the first fluidized bed from the top of the front chamber of the first fluidized bed. The clean coal gas obtained through purification of the exhaust enters into the bottom of the first fluidized bed as the fluidizing and reducing medium. After being reduced, the iron ore powder is discharged from the lower part of the first fluidized bed into the second fluidized bed for subsequent reduction. The sponge iron obtained from the reduction process is discharged from the second fluidized bed, passes through a hot magnetic separator to remove semi coke particles contained therein, and then goes into a smelting and separating furnace for slag-iron separation. The hot exhaust gas discharged from the top of the first fluidized bed passes through the cyclone dust remover for separation, and then enters into a combined cyclone-venturi preheater to heat up the iron ore powder while cooling down the exhaust gas. After passing through a waste heat boiler for heat recycling, the gas undergoes further dust removal through a bag-type dust remover and a venture-type dust remover and $CO_2$ removal through a $CO_2$ remover to yield clean coal gas for recycling as the fluidizing and reducing medium. Lurgi established a pilot scale test platform of a circulating fluidized bed with a diameter of 700 mm and an output of 5t/d for developing the Cirfofer technology. Until 2003, over ten rounds of tests have been conducted with a total running time of more than 70 days. However, from reports in existing documents, the Circofer technology only passed the above pilot scale test, without further reported pilot scale test or industrialized application.

In the HISmelt process, a transport bed, in combination with a four-stage cyclone preheater, preheats the iron ore powder before entering into a smelting and separating furnace (http://www.hismelt.com; Schenk et al., *Particuology*, 2011, 914-23). As it essentially does not belong to iron ore reduction technologies, and is not in close association with the present application, this technology is not detailed herein.

Except for the above fluidized-bed reduction processes which either have undergone pilot scale tests or further have been industrialized, many patents relating to the processes for reducing iron ore on fluidized beds have been filed home and aboard. In these patents, 2- to 4-stage fluidized beds are generally used for reduction, which is similar to the FIOR/FINMET and FINMET processes. Some of the processes are even essentially the same as the above two processes, whereas others differ in different combinations of stages of fluidized beds, powder preheating mode, gas preheating mode, gas operation mode, etc., thus forming a number of granted patents. It also indicates from one aspect that there is still a huge innovation space for the iron ore fluidized reduction process from the different combinations of the main aspects of stages of fluidized beds, iron powder preheating, reducing gas preheating and gas operation mode. The iron ore fluidized reduction processes home and abroad are analyzed from the above respects as follows.

1) Stages of fluidized beds: four-stage fluidized beds are used in the mainstream FIOR/FINMET and FINEX processes. Patents that employ similar four-stage fluidized beds for reduction also include: US20120328465 (2012), CN101892339 (2012), CN101397597 (2010), CN101519707 (2010), CN100560739 (2009), US20080277842 (2008), AU2001265669 (2001), etc., wherein their iron ore powder reduction parts are essentially the same as those of FIOR/FINMET and FINEX. The patents such as CN103221555 (2013), CN102127611 (2012), U.S. Pat. No. 6,960,238 (2005), U.S. Pat. No. 6,736,876 (2004), US20020166412 (2002), and U.S. Pat. No. 5,785,733 (1998) employ three-stage fluidized beds for reduction. Except for the Lurgi's process, CN201563469 (2010), CN101333575 (2010), and CN101906501 (2010) relate to two-stage fluidized beds for reduction.

2) Powder preheating: In the Lurgi's process, a combined circulating fluidized bed-cyclone preheater-venturi unit is used. In CN101906501 (2010), a five-stage cyclone preheater is used to preheat iron ore powder. In CN101333575 (2010), a slope furnace is used to preheat iron ore powder. In other patents without specific iron ore powder preheating unit, the last stage fluidized bed functions to preheat the iron ore powder, which is, in fact, essentially similar to those of the FIOR/FINMET and FINEX processes.

3) Gas preheating: a gas preheating unit is set up in the Lurgi's fluidized-bed reduction process, whereas in many patents including the patents relating to the FIOR/FINMET process (U.S. Pat. Nos. 5,082,251, and 5,192,486) and the FINEX process (U.S. Pat. Nos. 5,762,681, and 5,785,733), no preheating unit is involved or contained. However, if the gas is not preheated, the temperature of the fluidized bed cannot be maintained at 800° C. or above, which is required for the reaction. In some processes including those in patents such as CN10151970 (2010), CN101906501 (2010), AU2001265669 (2001), and U.S. Pat. No. 6,736,876 (2004), the hot gas discharged from a melting gasifier is introduced directly into the final stage fluidized bed so that the sensible heat of the hot gas from the melting gasifier can be directly utilized. However, the reducing capability of the hot gas would be weakened if the gases generated during the melting and separating process, such as $CO_2$, $H_2O$, etc., are not removed. Actually, a gas preheating unit is set up in the actual flow of FIOR/FINMET (Schenk et al., *Particuology*, 2011, 914-23), i.e., the reducing gas is preheated by a preheater before passing through the fourth stage fluidized bed, the third stage fluidized bed, the second stage fluidized bed and the first stage fluidized bed sequentially. As the reaction process absorbs heat in general, when no preheater is set up thereamong, the temperature of the fluidized bed falls gradually, reaching as low as 400-500° C. in the last stage fluidized bed (the first fluidized bed), resulting in poor reducing capabilities. To resolve this problem, U.S. Pat. No. 6,960,238 (2005) suggests that oxygen/air is introduced into hot gas before the gas enters into each fluidized bed so that the reducing gas would be directly heated up through its partially combustion. Though the temperature of the gas is elevated by direct partial combustion, the $CO_2$ and $H_2O$ generated from combustion would greatly lower the reduction potential and weaken the reducing capability of the gas, which is quite adverse to the reduction process.

4) Gas operation mode: in all existing processes, gas is operated in series and the reaction pressures vary significantly. The operating gage pressure is 11-13 atm for FIOR/FINMET; 2-4 atm. for FINEX; and 4 atm. for Circored. The operating gage pressure in CN100560739 is 4-10 atm. In some patents, such as CN101519707 (2010) and CN102127611 (2012), an operating pressure of 1-10 atm is provided. However, it is not operationally practical due to the wide range, because ten times of difference between the highest and the lowest operating pressures means the same ten times of difference between the highest and the lowest linear speeds of the fluidized beds, and generally it is hard for fluidized beds to have such operational flexibility. In many other patents, such as CN101333575 (2010), 101563469 (2010), CN103221555 (2013), and CN101892339 (2012), etc., the operating pressure is not described.

Although compared to a shaft furnace, the fluidized bed has many advantages including good contacting between the gas phase and solid phase, high heat and mass transfer efficiency, etc., the energy consumption for producing hot briquetted iron by the FIOR/FINMET process is about 15.0 GJ per ton, which is much higher than 10.5 GJ of the MIDREX process based on the shaft furnace, suggesting that the processes based on the fluidized bed still have much room for improvement in reducing energy consumption. Existing processes for reducing iron ore powder on fluidized beds still have the following two respects of problems.

High operational pressure: in both FIOR/FINMET and FINEX processes, high operating pressure is used (for example, the operating pressure in FIOR/FINMET is 12-14 atm). Since the gas compression process is energy-intensive, the gas compression consumption would be lowered greatly if the operating pressure can decrease to near atmosphere pressure (the operating pressure in MIDREX is 1-1.5 atm), and in turn the efficiency of fluidized-bed reduction of iron ore would be improved. One of the main reasons of using high-pressure operation in existing processes is that the diameter of the fluidized bed reactor can be reduced thereby. Since reducing iron ore to metallic iron by gas demands highly in thermodynamics, the iron trioxide in iron ore can be reduced to metallic iron only when the gas is excessive in a large amount. Therefore, a large amount of gas is required in the reduction process. An operation under the atmospheric pressure usually requires an oversized diameter of the fluidized bed. For example, in a 1-million-ton system using the FINMET process with an operating pressure of 12-14 atm, the diameter of the fluidized bed is still 5 m. It can be calculated that if the operation is conducted under the atmospheric pressure, the diameter of the fluidized bed will reach 17.7 m.

(2) low reduction efficiency: Although most processes use four-stage fluidized beds for reduction, no intermediary heat supplementation for the gas passing from the fourth stage to the first stage fluidized beds in series results in gradual reduction of the reaction temperature from the fourth stage to the first stage, with the temperature in the first-stage fluidized bed of only 400-500° C. Since iron ore exhibits slow reduction kinetics under a temperature below 700° C., the last two stages of the conventional four-stage fluidized beds play a minor role in reduction, resulting in a low overall reduction efficiency.

In summary, lowering operating pressure of the fluidized beds and increasing the overall reduction efficiency of the multi-stage fluidized beds through process and technical innovation are the key for reducing energy consumption during iron ore reduction on fluidized beds and improving economic efficiency of the reduction process.

SUMMARY OF THE INVENTION

The present invention aims to provide a system and method for reducing powdery iron ore on a fluidized bed, so as to overcome the defects in the prior art. The system and method have advantages such as high reducing efficiency, great economy, suitability for large scale industrial production and the like.

In order to achieve the above object, the present invention employs the following technical solutions.

The present invention provides a system for reducing powdery iron ore on a fluidized bed, comprising: a bin 1, a screw feeder 2, a bubbling fluidized bed 3, a primary feeder 4, a primary circulating fluidized bed 5, a secondary feeder 6, a secondary circulating fluidized bed 7, a tertiary feeder 8, a tertiary circulating fluidized bed 9, a discharger 10, a product bin 11, a pipeline burner 12, a primary coal gas preheater 13, a secondary coal gas preheater 14, and a tertiary coal gas preheater 15.

The bubbling fluidized bed 3 comprises a fluidized bed body 31, a first cyclone separator 32, a second cyclone separator 33, a third cyclone separator 34 and a feeder 35.

The primary circulating fluidized bed 5 comprises a primary riser 51, a fourth cyclone separator 52, a fifth cyclone separator 53 and a primary circulating dipleg 54.

The secondary circulating fluidized bed 7 comprises a secondary riser 71, a sixth cyclone separator 72, a seventh cyclone separator 73 and a secondary circulating dipleg 74.

The tertiary circulating fluidized bed 9 comprises a tertiary riser 91, an eighth cyclone separator 92, a ninth cyclone separator 93 and a tertiary circulating dipleg 94.

A feed outlet at the bottom of the bin 1 is provided with a pipeline which is connected to a feed inlet of the screw feeder 2, and the powdery iron ore is added to the screw feeder 2 through the pipeline. A feed outlet of the screw feeder 2 is connected to an inlet of the second cyclone separator 33 and a gas outlet of the first cyclone separator 32 through a pipeline.

The fluidized bed body 31 is a horizontal multi-compartment bubbling fluidized bed, and is provided with a gas outlet and a feed outlet at the upper portion, a gas inlet at the bottom, and a feed inlet at the lower portion. The gas outlet of the fluidized bed body 31 is connected to an inlet of the first cyclone separator 32, the feed inlet of the fluidized bed body 31 is connected to a feed outlet of the feeder 35, the gas inlet of the fluidized bed body 31 is connected to a gas outlet of the fifth cyclone separator 53 via a pipeline, and the feed outlet of the fluidized bed body 31 is connected to a feed inlet of the primary feeder 4 via a pipeline. The inlet of the first cyclone separator 32 is also connected to a feed outlet of the second cyclone separator 33 and a feed outlet of the third cyclone separator 34 via a pipeline, a feed outlet of the first cyclone separator 32 is connected to a feed inlet of the feeder 35, a gas inlet and feed outlet of the feeder 35 are connected to a coal gas main pipe and the feed inlet of the fluidized bed body 31, respectively, via a pipeline. An inlet of the second cyclone separator 33 is connected to the feed outlet of the screw feeder 2 and the gas outlet of the first cyclone separator 32 via a pipeline, a gas outlet of the second cyclone separator 33 is connected to an inlet of the third cyclone separator 34, and the feed outlet of the second cyclone separator 33 is connected to the inlet of the first cyclone separator 32. A gas outlet of the third cyclone separator 34 is connected to an inlet of a reduction exhaust gas treatment system, and the feed outlet of the third cyclone separator 34 is connected to the inlet of the first cyclone separator 32.

The gas inlet at the bottom of the fluidized bed body 31 is connected to the gas outlet of the fifth cyclone separator 53 through a pipeline, which is equipped with a pipeline burner 12. The pipeline burner 12 is provided with a nozzle which is connected to an air main pipe. Part of coal gas is burned in the pipeline burner 12 by passing air for increasing the temperature of the coal gas, so as to provide heat for pre-reduction in the bubbling fluidized bed body.

The primary feeder 4 is provided with a feed inlet, a gas inlet and a feed outlet. The feed inlet of the primary feeder 4 is connected to the feed outlet of the fluidized bed body 31 through a pipeline, the gas inlet of the primary feeder 4 is connected to the coal gas main pipe, and the feed outlet of the primary feeder 4 is connected to a lower feed inlet of the primary riser 51 through a pipeline.

The primary riser 51 is provided with a gas outlet at the top, a gas inlet at the bottom, and a feed inlet and a circulating return port at the lower portion. The gas outlet of the primary riser 51 is connected to an inlet of the fourth cyclone separator 52, the feed inlet of the primary riser 51 is connected to the feed outlet of the primary feeder 4, and the gas inlet of the primary riser 51 is connected to a coal gas outlet of the primary coal gas preheater 13 through a pipeline. A gas outlet of the fourth cyclone separator 52 is connected to an inlet of the fifth cyclone separator 53, and a discharge port of the fourth cyclone separator 52 is connected to the primary circulating dipleg 54. The primary circulating dipleg 54 is provide with a return port and a discharge port at the lower portion, and the return port of the primary circulating dipleg 54 is connected to the circulating return port of the primary riser 51 through a pipeline, the discharge port of the primary circulating dipleg 54 is connected to a lower feed inlet of the secondary riser 71 through a pipeline, and a gas inlet of the primary circulating dipleg 54 is connected to the coal gas main pipe through a pipeline. The gas outlet of the fifth cyclone separator 53 is connected to the gas inlet at the bottom of the fluidized bed body 31, and a discharge port of the fifth cyclone separator 53 is connected to a feed inlet of the secondary feeder 6 through a pipeline.

The secondary feeder 6 is provided with a feed inlet, a gas inlet and a feed outlet. The feed inlet of the secondary feeder 6 is connected to the discharge port of the fifth cyclone separator 53, the gas inlet of the secondary feeder 6 is connected to the coal gas main pipe, and the feed outlet of the secondary feeder 6 is connected to the an upper feed inlet of the secondary riser 71 through a pipeline.

The secondary riser 71 provided with a gas outlet at the top, an upper feed inlet at the upper portion, a gas inlet at the bottom, and the lower feed inlet and a circulating return port at the lower portion. The gas outlet of the secondary riser 71 is connected to an inlet of the sixth cyclone separator 72, the upper feed inlet of the secondary riser 71 is connected to the feed outlet of the secondary feeder 6, the lower feed inlet of the secondary riser 71 is connected to the discharge port of the primary circulating dipleg 54 through a pipeline, and the gas inlet of the secondary riser 71 is connected to a coal gas outlet of the secondary coal gas preheater 14 through a pipeline. A gas outlet of the sixth cyclone separator 72 is connected to an inlet of the seventh cyclone separator 73, and a discharge port of the sixth cyclone separator 72 is connected to the secondary circulating dipleg 74. The secondary circulating dipleg 74 is provided with a return port and a discharge port at the lower portion. The return port of the secondary circulating dipleg 74 is connected to the circulating return port of the secondary riser 71 through a pipeline, the discharge port of the secondary circulating dipleg 74 is connected to a lower feed inlet of the tertiary riser 91 through a pipeline, and the gas inlet of the secondary circulating dipleg 74 is connected to the coal gas main pipe through a pipeline. A gas outlet of the seventh cyclone separator is connected to the inlet of the reduction exhaust gas treatment system, and a discharge port of the seventh cyclone separator is connected to a feed inlet of the tertiary feeder 8 through a pipeline.

The tertiary feeder 8 is provided with a feed inlet, a gas inlet and a feed outlet. The feed inlet of the tertiary feeder 8 is connected to a discharge port of the seventh cyclone separator 73, the gas inlet of the tertiary feeder 8 is connected to the coal gas main pipe, and the feed outlet of the tertiary feeder 8 is connected to the an upper feed inlet of the tertiary riser 91 through a pipeline.

The tertiary riser 91 provided with a gas outlet at the top, an upper feed inlet at the upper portion, a gas inlet at the bottom, and a lower feed inlet and a circulating return port at the lower portion. The gas outlet of the tertiary riser 91 is connected to an inlet of the eighth cyclone separator 92, the upper feed inlet of the tertiary riser 91 is connected to the feed outlet of tertiary feeder 8, the lower feed inlet of the tertiary riser 91 is connected to the discharge port of the secondary circulating dipleg 74 through a pipeline, and the gas inlet of the tertiary riser 91 is connected to a coal gas outlet of the tertiary coal gas preheater 15 through a pipeline. A gas outlet of the eighth cyclone separator 92 is connected to an inlet of the ninth cyclone separator 93, and a discharge port of the eighth cyclone separator 92 is connected to the tertiary circulating dipleg 94. The tertiary circulating dipleg 94 is provided with a return port and a discharge port at the lower portion. The return port of the tertiary circulating dipleg 94 is connected to the circulating return port of the tertiary riser 91 through a pipeline, the discharge port of the tertiary circulating dipleg 94 is connected to the product bin 11 through a pipeline, and a gas inlet of the tertiary circulating dipleg 94 is connected to the coal gas main pipe through a pipeline. A gas outlet of the ninth cyclone separator 93 is connected to the inlet of the reduction exhaust gas treatment system, and a discharge port of the ninth cyclone separator 93 is connected to a feed inlet of the discharger 10 through a pipeline.

The discharger 10 is provided with a feed inlet, a gas inlet and a feed outlet. The feed inlet of the discharger 10 is connected to the discharge port of the ninth cyclone separator 73, the gas inlet of the discharger 10 is connected to the coal gas main pipe, and the feed outlet of the discharger 10 is connected to the product bin 11 through a pipeline.

The coal gas preheater is divided into the primary coal gas preheater 13, the secondary coal gas preheater 14 and the tertiary coal gas preheater 15, which preheat the fluidized coal gas of the primary circulating fluidized bed 5, the secondary circulating fluidized bed 7 and the tertiary circulating fluidized bed 9, respectively. Any one of the primary coal gas preheater 13, secondary coal gas preheater 14 and the tertiary coal gas preheater 15 is provided with a nozzle, a flue gas outlet, a coal gas inlet and a coal gas outlet. The nozzle is used for burning the coal gas to generate a high temperature flue gas to provide the heat required for preheating the reducing coal gas, and the nozzle is connected to the air main pipe and the coal gas main pipe through a pipeline. The flue gas outlet is connected to a flue gas main pipe, and the discharged flue gas enters into a flue gas treatment system via the flue gas main pipe for heat recovery. The coal gas inlet is connected to the coal gas main pipe, and the coal gas outlet of the primary coal gas preheater 13 is connected to the gas inlet at the bottom of the primary riser 51, the coal gas outlet of the secondary coal gas preheater 14 is connected to the gas inlet at the bottom of the secondary riser 71, and the coal gas outlet of the tertiary coal gas preheater 15 is connected to the gas inlet at the bottom of the tertiary riser 91.

The present invention also provides a method of reduction based on the above system for reducing powdery iron ore on a fluidized bed, comprising: allowing a powder and gas to enter into and pass through the above system simultaneously in the following way: the powdery iron ore enters into the second cyclone separator 33, the third cyclone separator 34 and the first cyclone separator 32 from the bin 1 via the screw feeder 2, then enters into the bubbling fluidized bed body 31 via the feeder 35. After being discharged from an upper feed outlet of the bubbling fluidized bed body 31, the powdery iron ore enters into the primary riser 51 of the primary circulating fluidized bed 5 via the primary feeder 4, and is discharged via the fourth cyclone separator 52 and the primary circulating dipleg 54, and then enters into the secondary riser 71 of the secondary circulating fluidized bed 7, while the powder collected by the fifth cyclone separator 53 also enters into the secondary riser 71 of the secondary circulating fluidized bed 7 via the secondary feeder 6. Then, the powder is discharged via the sixth cyclone separator 72 and the secondary circulating dipleg 74 and enters into the tertiary riser 91 of the tertiary circulating fluidized bed 9, while the powder collected by the seventh cyclone separator 73 also enters into the tertiary riser 91 of the tertiary circulating fluidized bed 9 via the tertiary feeder 8. A reduction powder product of the tertiary circulating fluidized bed 9 is discharged via the eighth cyclone separator 92 and the tertiary circulating dipleg 94 and enters into the product bin 11, while the powder product collected by the ninth cyclone separator 93 also enters into the product bin 11 via the discharger 10. The coal gas enters into the primary riser 51, the secondary riser 71 and the tertiary riser 91 respectively to contact with the ore powder for reduction after being preheated by the primary coal gas preheater 13, the secondary coal gas preheater 14 and the tertiary coal gas preheater 15. In the meantime, the coal gas enters into the reducing system through the corresponding gas inlets at the bottom of the feeder 35, the primary feeder 4, the primary circulating dipleg 54, the secondary feeder 6, the secondary circulating dipleg 74, the tertiary feeder 8, the tertiary circulating dipleg 94 and the discharger 10, respectively, via the pipeline. The gas discharged by the primary riser 51 is subjected to powder removing treatment by the fourth cyclone separator 52 and the fifth cyclone separator 53, then enters into the pipeline burner 12 where the gas is subjected to partial combustion with air from the air main pipe for increasing the temperature, and then enters into the bubbling fluidized bed body 31 to contact with the ore powder for pre-reduction. The gas discharged by the bubbling fluidized bed body 31 enters into the reduction exhaust gas treatment system via the pipeline after exchanging heat with the powdery iron ore through the first cyclone separator 32, the second cyclone separator 33 and the third cyclone separator 34. The gas discharged by the secondary riser 71 enters into the reduction exhaust gas treatment system via the pipeline after being subjected to powder removing treatment by the sixth cyclone separator 72 and the seventh cyclone separator 73. The gas discharged by the tertiary riser 91 enters into the reduction exhaust gas treatment system via the pipeline after being subjected to powder removing treatment by the eighth cyclone separator 92 and the ninth cyclone separator 93. The coal gas and air enter into the primary coal gas preheater 13, the secondary coal gas preheater 14 and the tertiary coal gas preheater 15 via the nozzle for combustion to generate heat for preheating the coal gas, and enter into the flue gas treatment system via the pipeline.

The improvement of the present invention lies in that the powdery iron ore successively passes through the bubbling fluidized bed, the primary circulating fluidized bed, the secondary circulating fluidized bed and the tertiary circulating fluidized bed in series; the reducing coal gas reduces the powdery iron ore in series-parallel hybrid mode, the preheating coal gas passes through the primary circulating fluidized bed, the secondary circulating fluidized bed and the tertiary circulating fluidized bed in parallel mode, the reducing gas of the primary circulating fluidized bed and the bubbling fluidized bed is operated in series, and the exhaust gas discharged by the primary circulating fluidized bed enters into the bubbling fluidized bed in series to pre-reduce the powdery iron ore.

The further improvement of the present invention lies in that the powdery iron ore is pre-reduced by using a horizontal multi-compartment bubbling fluidized bed, and the pre-reducing comprises reducing the powdery iron ore to ferrous oxide, and the pre-reducing is carried out at 650-750° C. for 20-70 minutes.

The still further improvement of the process of the present invention lies in that the pre-reduced powdery iron ore is reduced by three-stage circulating fluidized bed, wherein the circulating fluidized bed is operated at a high gas velocity of 5-10 m/s, and the reduction is carried out at 800-900° C. for 30-70 minutes.

The yet further improvement of the process of the present invention lies in that the reduction process is carried out at a low pressure, wherein the low pressure is an operating pressure of less than 1 atm.

When the iron ore powder is reduced by the present invention, the reactor, at a pressure of less than 1 atm, can be of a size which is the same as or smaller than that of the reactor used in the conventional process under the high pressure operation, thereby overcoming the deficiency of high-power gas compression resulting from the high pressure in the traditional technology. Moreover, in the present invention, the reduction of the coal gas is operated in series-parallel mode, which can increases the coal gas utilization, and the high operating gas velocity enhances the reduction rate of the powdery iron ore. Moreover, the present invention has advantages such as high reducing efficiency and low energy consumption in reduction process and the like, and can improve the economy in the process of reducing the powdery iron ore.

BRIEF DESCRIPTION OF THE DRAWINGS

The accompanying drawings are provided to further illustrate the present invention, and constitute a part of the specification. The drawings, together with the examples of the present invention, are used to explain the present invention, and not construed as limiting the present invention.

FIG. 1 is a schematic diagram illustrating the configuration of a system for reducing powdery iron ore on a fluidized bed according to the present invention:

Reference signs: 1, bin; 2, screw feeder; 3, bubbling fluidized bed; 31, fluidized bed body; 32, first cyclone separator; 33, second cyclone separator; 34, third cyclone separator; 35, feeder; 4, primary feeder; 5, primary circulating fluidized bed; 51, primary riser; 52, fourth cyclone separator; 53, fifth cyclone separator; 54, primary circulating dipleg; 6, secondary feeder; 7, secondary circulating fluidized bed; 71, secondary riser; 72, sixth cyclone separator; 73, seventh cyclone separator; 74, secondary circulating dipleg; 8, tertiary feeder; 9, tertiary circulating fluidized bed; 91, tertiary riser; 92, eighth cyclone separator; 93, ninth cyclone separator; 94, tertiary circulating dipleg; 10, discharger; 11, product bin; 12, pipeline burner; 13, primary coal gas preheater; 14, secondary coal gas preheater; 15, tertiary coal gas preheater.

DETAILED DESCRIPTION OF THE INVENTION

In order to make the purpose, technical solutions and advantages of the present invention more apparent, a clear and complete description about the technical solutions of the examples in the present invention will be provided below with reference to the accompanying drawings of the present invention. Obviously, the examples described below are part of the examples of the present invention, rather than all of the examples. Other examples obtained by those of the ordinary skill in the art based on the examples of the present invention without creative effort also fall into the scope of protection of the present invention.

Example 1

A system for reducing powdery iron ore on a fluidized bed comprises: a bin 1, a screw feeder 2, a bubbling fluidized bed 3, a primary feeder 4, a primary circulating fluidized bed 5, a secondary feeder 6, a secondary circulating fluidized bed 7, a tertiary feeder 8, a tertiary circulating fluidized bed 9, a discharger 10, a product bin 11, a pipeline burner 12, a primary coal gas preheater 13, a secondary coal gas preheater 14, and a tertiary coal gas preheater 15.

The bubbling fluidized bed 3 comprises a fluidized bed body 31, a first cyclone separator 32, a second cyclone separator 33, a third cyclone separator 34 and a feeder 35.

The primary circulating fluidized bed 5 comprises a primary riser 51, a fourth cyclone separator 52, a fifth cyclone separator 53 and a primary circulating dipleg 54.

The secondary circulating fluidized bed 7 comprises a secondary riser 71, a sixth cyclone separator 72, a seventh cyclone separator 73 and a secondary circulating dipleg 74.

The tertiary circulating fluidized bed 9 comprises a tertiary riser 91, an eighth cyclone separator 92, a ninth cyclone separator 93 and a tertiary circulating dipleg 94.

A feed outlet at the bottom of the bin 1 is provided with a pipeline, which is connected to a feed inlet of the screw feeder 2, and powdery iron ore is added to the screw feeder 2 through the pipeline. A feed outlet of the screw feeder 2 is connected to an inlet of the second cyclone separator 33 and a gas outlet of the first cyclone separator 32 through a pipeline.

The fluidized bed body 31 is a horizontal multi-compartment bubbling fluidized bed, and is provided with a gas outlet and a feed outlet at the upper portion, a gas inlet at the bottom, and a feed inlet at the lower portion. The gas outlet of the fluidized bed body 31 is connected to an inlet of the first cyclone separator 32, the feed inlet of the fluidized bed body 31 is connected to a feed outlet of the feeder 35, the gas inlet of the fluidized bed body 31 is connected to a gas outlet of the fifth cyclone separator 53 via a pipeline, and the feed outlet of the fluidized bed body 31 is connected to a feed inlet of the primary feeder 4 via a pipeline. The inlet of the first cyclone separator 32 is also connected to a feed outlet of the second cyclone separator 33 and a feed outlet of the third cyclone separator 34 via a pipeline, a feed outlet of the first cyclone separator 32 is connected to a feed inlet of the feeder 35, a gas inlet and feed outlet of the feeder 35 are connected to a coal gas main pipe and the feed inlet of the fluidized bed body 31, respectively, via a pipeline. An inlet of the second cyclone separator 33 is connected to the feed outlet of the screw feeder 2 and the gas outlet of the first cyclone separator 32 via a pipeline, a gas outlet of the second cyclone separator 33 is connected to an inlet of the third cyclone separator 34, and the feed outlet of the second cyclone separator 33 is connected to the inlet of the first cyclone separator 32. A gas outlet of the third cyclone separator 34 is connected to an inlet of a reduction exhaust gas treatment system, and the feed outlet of the third cyclone separator 34 is connected to the inlet of the first cyclone separator 32.

The gas inlet at the bottom of the fluidized bed body 31 is connected to the gas outlet of the fifth cyclone separator 53 through a pipeline, which is equipped with a pipeline burner 12. The pipeline burner 12 is provided with a nozzle, which is connected to an air main pipe. Part of coal gas is burned in the pipeline burner 12 by passing air for increasing the temperature of the coal gas, so as to provide heat for pre-reduction in the bubbling fluidized bed body.

The primary feeder 4 is provided with a feed inlet, a gas inlet and a feed outlet. The feed inlet of the primary feeder 4 is connected to the feed outlet of the fluidized bed body 31 through a pipeline. The gas inlet of the primary feeder 4 is connected to the coal gas main pipe. The feed outlet of the primary feeder 4 is connected to a lower feed inlet of the primary riser 51 through a pipeline.

The primary riser 51 is provided with a gas outlet at the top, a gas inlet at the bottom, and a feed inlet and a circulating return port at the lower portion. The gas outlet of the primary riser 51 is connected to an inlet of the fourth cyclone separator 52, the feed inlet of the primary riser 51 is connected to the feed outlet of the primary feeder 4, and the gas inlet of the primary riser 51 is connected to a coal gas outlet of the primary coal gas preheater 13 through a pipeline. A gas outlet of the fourth cyclone separator 52 is connected to an inlet of the fifth cyclone separator 53, and a discharge port of the fourth cyclone separator 52 is connected to the primary circulating dipleg 54. The primary circulating dipleg 54 is provide with a return port and a discharge port at the lower portion. The return port of the primary circulating dipleg 54 is connected to the circulating return port of the primary riser 51 through a pipeline, the discharge port of the primary circulating dipleg 54 is connected to a lower feed inlet of the secondary riser 71 through a pipeline, and a gas inlet of the primary circulating dipleg 54 is connected to the coal gas main pipe through a pipeline. The gas outlet of the fifth cyclone separator 53 is connected to the gas inlet at the bottom of the fluidized bed body 31, and a discharge port of the fifth cyclone separator 53 is connected to a feed inlet of the secondary feeder 6 through a pipeline.

The secondary feeder 6 is provided with a feed inlet, a gas inlet and a feed outlet. The feed inlet of the secondary feeder 6 is connected to the discharge port of the fifth cyclone separator 53, the gas inlet of the secondary feeder 6 is connected to the coal gas main pipe, and the feed outlet of the secondary feeder 6 is connected to the an upper feed inlet of the secondary riser 71 through a pipeline.

The secondary riser 71 provided with a gas outlet at the top, an upper feed inlet at the upper portion, a gas inlet at the bottom, and the lower feed inlet and a circulating return port at the lower portion. The gas outlet of the secondary riser 71 is connected to an inlet of the sixth cyclone separator 72, the upper feed inlet of the secondary riser 71 is connected to the feed outlet of the secondary feeder 6, the lower feed inlet of the secondary riser 71 is connected to the discharge port of the primary circulating dipleg 54 through a pipeline, and the gas inlet of the secondary riser 71 is connected to a coal gas outlet of the secondary coal gas preheater 14 through a pipeline. A gas outlet of the sixth cyclone separator 72 is connected to an inlet of the seventh cyclone separator 73, and a discharge port of the sixth cyclone separator 72 is connected to the secondary circulating dipleg 74. The secondary circulating dipleg 74 is provided with a return port and a discharge port at the lower portion. The return port of the secondary circulating dipleg 74 is connected to the circulating return port of the secondary riser 71 through a pipeline, the discharge port of the secondary circulating dipleg 74 is connected to a lower feed inlet of the tertiary riser 91 through a pipeline, and the gas inlet of the secondary circulating dipleg 74 is connected to the coal gas main pipe through a pipeline. A gas outlet of the seventh cyclone separator is connected to the inlet of the reduction exhaust gas treatment system, and a discharge port of the seventh cyclone separator is connected to a feed inlet of the tertiary feeder 8 through a pipeline.

The tertiary feeder 8 is provided with a feed inlet, a gas inlet and a feed outlet. The feed inlet of the tertiary feeder 8 is connected to a discharge port of the seventh cyclone separator 73, the gas inlet of the tertiary feeder 8 is connected to the coal gas main pipe, and the feed outlet of the tertiary feeder 8 is connected to the an upper feed inlet of the tertiary riser 91 through a pipeline.

The tertiary riser 91 provided with a gas outlet at the top, an upper feed inlet at the upper portion, a gas inlet at the bottom, and a lower feed inlet and a circulating return port at the lower portion. The gas outlet of the tertiary riser 91 is connected to an inlet of the eighth cyclone separator 92, the upper feed inlet of the tertiary riser 91 is connected to the feed outlet of tertiary feeder 8, the lower feed inlet of the tertiary riser 91 is connected to the discharge port of the secondary circulating dipleg 74 through a pipeline, and the gas inlet of the tertiary riser 91 is connected to a coal gas outlet of the tertiary coal gas preheater 15 through a pipeline. A gas outlet of the eighth cyclone separator 92 is connected to an inlet of the ninth cyclone separator 93, and a discharge port of the eighth cyclone separator 92 is connected to the tertiary circulating dipleg 94. The tertiary circulating dipleg 94 is provided with a return port and a discharge port at the lower portion, and the return port of the tertiary circulating dipleg 94 is connected to the circulating return port of the tertiary riser 91 through a pipeline, the discharge port of the tertiary circulating dipleg 94 is connected to the product bin 11 through a pipeline, and a gas inlet of the tertiary circulating dipleg 94 is connected to the coal gas main pipe through a pipeline. A gas outlet of the ninth cyclone separator 93 is connected to the inlet of the reduction exhaust gas treatment system, and a discharge port of the ninth cyclone separator 93 is connected to a feed inlet of the discharger 10 through a pipeline.

The discharger 10 is provided with a feed inlet, a gas inlet and a feed outlet. The feed inlet of the discharger 10 is connected to the discharge port of the ninth cyclone separator 73, the gas inlet of the discharger 10 is connected to the coal gas main pipe, and the feed outlet of the discharger 10 is connected to the product bin 11 through a pipeline.

The coal gas preheater is divided into the primary coal gas preheater 13, the secondary coal gas preheater 14 and the tertiary coal gas preheater 15, which preheat the fluidized coal gas of the primary circulating fluidized bed 5, the secondary circulating fluidized bed 7 and the tertiary circulating fluidized bed 9, respectively. Any one of the primary coal gas preheater 13, secondary coal gas preheater 14 and the tertiary coal gas preheater 15 is provided with a nozzle, a flue gas outlet, a coal gas inlet and a coal gas outlet. The nozzle is used for burning the coal gas to generate a high temperature flue gas to provide the heat required for preheating the reducing coal gas, and the nozzle is connected to the air main pipe and the coal gas main pipe through a pipeline. The flue gas outlet is connected to a flue gas main pipe, and the discharged flue gas enters into a flue gas treatment system via the flue gas main pipe for heat recovery. The coal gas inlet is connected to the coal gas main pipe, and the coal gas outlet of the primary coal gas preheater 13 is connected to the gas inlet at the bottom of the primary riser 51, the coal gas outlet of the secondary coal gas preheater 14 is connected to the gas inlet at the bottom of the secondary riser 71, and the coal gas outlet of the tertiary coal gas preheater 15 is connected to the gas inlet at the bottom of the tertiary riser 91.

Example 2

The method of reducing powdery iron ore by the system for reducing powdery iron ore on a fluidized bed according to Example 1 comprises the following steps: the powdery iron ore is sent to the inlet of the second cyclone separator 33 from the bin 1 via the screw feeder 2, the powdery iron ore separated and collected by the second cyclone separator 33 and the third cyclone separator 34 respectively enters into the inlet of the first cyclone separator 32 through the pipeline, and then enters into the first cyclone separator 32 for gas-solid separation after being mixed with the exhaust gas discharged by the fluidized bed body 31, and the powdery iron ore is discharged from the feed outlet at the bottom of the first cyclone separator 32 and then enters into the fluidized bed body 31 via the feeder 35. The powdery iron ore is subjected to a pre-reduction reaction in the bubbling fluidized bed 3, and then discharged from the feed outlet at the upper portion of the fluidized bed body 31, then enters into the primary riser 51 via the primary feeder 4, and discharged from the primary circulating dipleg 54 after being reduced in the primary circulating fluidized bed, and then enters into the secondary riser 71 of the secondary circulating fluidized bed 7 via the lower feed inlet. Meanwhile, the powdery iron ore collected by the fifth cyclone separator 53 enters into the secondary riser 71 from the upper feed inlet via the secondary feeder 6. The powdery iron ore is subjected to a reaction in the secondary circulating fluidized bed 7 and then discharged from the secondary circulating dipleg 74, and enters into the tertiary riser 91 of the tertiary circulating fluidized bed 9 via the lower feed inlet. Meanwhile, the powdery iron ore collected by the seventh cyclone separator 73 enters into the tertiary riser 91 from the upper feed inlet via the secondary feeder 8. The iron ore powder is reduced in the tertiary circulating fluidized bed 9 and then discharged from the tertiary circulating dipleg 94 and enters into product bin 11. Meanwhile, the powdery iron ore collected by the ninth cyclone separator 93 enters into the product bin 11 via the discharger 10.

The coal gas, via the coal gas main pipe, is divided into three parts which enter into the primary coal gas preheater 13, the secondary coal gas preheater 14 and the tertiary coal gas preheater 15, respectively. The coal gas is discharged from the coal gas outlet of the primary coal gas preheater 13, the secondary coal gas preheater 14 and the tertiary coal gas preheater 15 after being preheated, and enters into the primary riser 51, the secondary riser 71 and the tertiary riser 91, respectively, via the gas inlet at the bottom, and is subjected to a reduction reaction with the powdery iron ore in the primary circulating fluidized bed 5, secondary circulating fluidized bed 7 and the tertiary circulating fluidized bed 9. The reduction exhaust gas discharged from the primary circulating fluidized bed 5 is subjected to gas-solid separation by the fourth cyclone separator 52 and the fifth cyclone separator 53, and then enters into the gas inlet at the lower portion of the fluidized body 31 through the pipeline. The pipeline connecting the fifth cyclone separator 53 and the fluidized bed body 31 is provided with the pipeline burner 12, and the nozzle of the pipeline burner 12 is connected to the air main pipe, and the temperature of the reduction exhaust gas of the primary circulating fluidized bed is increased by partial combustion. The reduction exhaust gas warmed by combustion in the pipeline preheater 12 pre-reduces the powdery iron ore in the bubbling fluidized bed 3 and then discharged from the gas outlet at the upper portion of the fluidized bed body 31, and discharged to the reduction exhaust gas treatment system after being dedusted by the first cyclone separator 32, second cyclone separator 33 and the third cyclone separator 34. The reduction exhaust gas discharged by the risers of the secondary circulating fluidized bed 7 and the tertiary circulating fluidized bed 9 is subjected to gas-solid separation by the sixth cyclone separator 72 and the eighth cyclone separator 92, the seventh cyclone separator 73 and the ninth cyclone separator 93, then discharged to the reduction exhaust gas treatment system. The heat required for preheating the coal gas in the primary coal gas preheater 13, the secondary coal gas preheater 14 and the tertiary coal gas preheater 15 is obtained through combustion of the coal gas by the nozzle, and the coal gas and air from the coal gas main pipe and the air main pipe are sent to the nozzles of the primary coal gas preheater 13, the secondary coal gas preheater 14 and the tertiary coal gas preheater 15, respectively, through the pipeline, and burned in the primary coal gas preheater 13, the secondary coal gas preheater 14 and the tertiary coal gas preheater 15 after being lighted by the nozzle, then discharged through the flue gas outlet of the primary coal gas preheater 13, secondary coal gas preheater 14 and the tertiary coal gas preheater 15, and then enter into the flue gas treatment system.

Example 3

The iron ore comprised of 85.2% $Fe_2O_3$, 2.7% CaO, 1.8% MgO, 3.2% $Al_2O_3$ and 7.1% $SiO_2$ (percentage by mass) was processed according to the present invention The powdery iron ore had a particle size of 0.10-1.0 mm. The powdery iron ore was pre-reduced in the bubbling fluidized bed through the above process of the present invention, and $Fe_2O_3$ in the powdery iron ore could be reduced to FeO at 650° C. for 70 min, at 700° C. for 35 min, or at 750° C. for 20 min. The pre-reduced powdery iron ore was reduced in a three-stage circulating fluidized bed through the above process of the present invention. When each stage of the circulating fluidized bed was operated under the conditions of reduction temperature of 800° C., reduction time of 70 minutes and operating gas velocity of 5 m/s with a corresponding maximum operating pressure of 0.35 atm, the metallization ratio of the powdery iron ore from the outlet of the tertiary circulating fluidized bed reached 83.5%. When each stage of the circulating fluidized bed was operated under the conditions of reduction temperature of 850° C., reduction time of 30 minutes and operating gas velocity of 10 m/s with a corresponding maximum operating pressure of 0.73 atm, the metallization ratio of the powdery iron ore from the outlet of the tertiary circulating fluidized bed reached 88.2%. When each stage of the circulating fluidized bed was operated under the conditions of reduction temperature of 900° C., reduction time of 30 minutes and operating gas velocity of 9 m/s with a corresponding maximum operating pressure of 0.71 atm, the metallization ratio of the powdery iron ore from the outlet of the tertiary circulating fluidized bed reached 95.1%. When each stage of the circulating fluidized bed was operated under the conditions of reduction temperature of 900° C., reduction time of 60 minutes and operating gas velocity of 9 m/s with a corresponding maximum operating pressure of 0.72 atm, the metallization ratio of the powdery iron ore from the outlet of the tertiary circulating fluidized bed reached 96.3%.

Finally, it should be noted that the above examples are merely provided for illustrating the technical solutions of the present invention, rather than limiting the present invention. Although the present invention has been described in detail with reference to the above examples, those of ordinary skill in the art will appreciate that they can still modify the technical solutions described in each example above, or make equivalent replacements for some technical features therein. However, such modifications or replacements will not render the essence of corresponding technical solutions departing from the spirit and scope of the technical solutions in each example of the present invention.

What is claimed is:

1. A system for reducing powdery iron ore on a fluidized bed, comprising: a bin, a screw feeder, a bubbling fluidized bed, a primary feeder, a primary circulating fluidized bed, a secondary feeder, a secondary circulating fluidized bed, a tertiary feeder, a tertiary circulating fluidized bed, a discharger, a product bin, a pipeline burner, a primary coal gas preheater, a secondary coal gas preheater, and a tertiary coal gas preheater;

wherein the bubbling fluidized bed comprises a fluidized bed body, a first cyclone separator, a second cyclone separator, a third cyclone separator and a feeder;

the primary circulating fluidized bed comprises a primary riser, a fourth cyclone separator, a fifth cyclone separator and a primary circulating dipleg;

the secondary circulating fluidized bed comprises a secondary riser, a sixth cyclone separator, a seventh cyclone separator and a secondary circulating dipleg;

the tertiary circulating fluidized bed comprises a tertiary riser, an eighth cyclone separator, a ninth cyclone separator and a tertiary circulating dipleg;

a feed outlet of the bin is connected to a feed inlet of the screw feeder, and a feed outlet of the screw feeder is connected to a gas outlet of the first cyclone separator and an inlet of the second cyclone separator, respectively, through a pipeline;

an inlet of the first cyclone separator is connected to a feed outlet of the second cyclone separator, a feed outlet of the third cyclone separator and a gas outlet of the fluidized bed body, respectively, through a pipeline, a feed outlet of the first cyclone separator is connected to a feed inlet of the feeder, and a gas outlet of the first cyclone separator is connected to an inlet of the second cyclone separator;

a gas outlet of the second cyclone separator is connected to an inlet of the third cyclone separator, and a gas outlet of the third cyclone separator is connected to a reduction exhaust gas treatment system;

a gas inlet of the feeder is connected to a coal gas main pipe, and a feed outlet of the feeder is connected to a feed inlet of the fluidized bed body through a pipeline;

a feed outlet of the fluidized bed body is connected to a feed inlet of the primary feeder through a pipeline, a gas inlet of the fluidized bed body is connected to a gas outlet of the fifth cyclone separator through a pipeline which is provided with the pipeline burner, wherein the pipeline burner is provided with a nozzle which is connected to an air main pipe, and is configured such that part of coal gas is burned in the pipeline burner by passing air for increasing the temperature of the coal gas, so as to provide heat for pre-reduction in the fluidized bed body;

a gas inlet of the primary feeder is connected to the coal gas main pipe, and a feed outlet of the primary feeder is connected to a feed inlet of the primary riser through a pipeline;

a gas outlet of the primary riser is connected to an inlet of the fourth cyclone separator, a gas inlet of the primary riser is connected to a coal gas outlet of the primary coal gas preheater through a pipeline, and a circulating return port of the primary riser is connected to a return port of the primary circulating dipleg;

a gas outlet of the fourth cyclone separator is connected to an inlet of the fifth cyclone separator, and a discharge port of the fourth cyclone separator is connected to the primary circulating dipleg;

a discharge port of the primary circulating dipleg is connected to a lower feed inlet of the secondary riser, and a gas inlet of the primary circulating dipleg is connected to the coal gas main pipe;

a gas outlet of the fifth cyclone separator is connected to a gas inlet of the fluidized bed body through a pipeline, and a discharge port of the fifth cyclone separator is connected to a feed inlet of the secondary feeder through a pipeline;

a gas inlet of the secondary feeder is connected to the coal gas main pipe, and a feed outlet of the secondary feeder is connected to an upper feed inlet of the secondary riser through a pipeline;

a gas outlet of the secondary riser is connected to an inlet of the sixth cyclone separator, a gas inlet of the secondary riser is connected to a coal gas outlet of the secondary coal gas preheater through a pipeline, and a circulating return port of the secondary riser is connected to a return port of the secondary circulating dipleg;

a gas outlet of the sixth cyclone separator is connected to an inlet of the seventh cyclone separator, and a discharge port of the sixth cyclone separator is connected to the secondary circulating dipleg;

a discharge port of the secondary circulating dipleg is connected to a lower feed inlet of the tertiary riser, and a gas inlet of the secondary circulating dipleg is connected to the coal gas main pipe;

a gas outlet of the seventh cyclone separator is connected to an inlet of the reduction exhaust gas treatment system, and a discharge port of the seventh cyclone separator is connected to a feed inlet of the tertiary feeder through a pipeline;

a gas inlet of the tertiary feeder is connected to the coal gas main pipe, and a feed outlet of the tertiary feeder is connected to an upper feed inlet of the tertiary riser through a pipeline;

a gas outlet of the tertiary riser is connected to an inlet of the eighth cyclone separator, a gas inlet of the tertiary riser is connected to a coal gas outlet of the tertiary coal gas preheater through a pipeline, and a circulating return port of the tertiary riser is connected to a return port of the tertiary circulating dipleg;

a gas outlet of the eighth cyclone separator is connected to an inlet of the ninth cyclone separator, and a discharge port of the eighth cyclone separator is connected to the tertiary circulating dipleg;

a discharge port of the tertiary circulating dipleg is connected to the product bin through a pipeline, and a gas inlet of the tertiary circulating dipleg is connected to the coal gas main pipe;

a gas outlet of the ninth cyclone separator is connected to the inlet of the reduction exhaust gas treatment system, and a discharge port of the ninth cyclone separator is connected to a feed inlet of the discharger through a pipeline;

a gas inlet of the discharger is connected to the coal gas main pipe, and a feed outlet of the discharger is connected to the product bin through a pipeline;

a nozzle of any one of the primary coal gas preheater, the secondary coal gas preheater and the tertiary coal gas preheater is connected to the air main pipe and the coal gas main pipe through a pipeline, a high temperature flue gas is generated by burning the coal gas for preheating a reducing coal gas, a flue gas outlet of any one of the coal gas preheaters is connected to a flue gas main pipe, and a discharged flue gas enters into a flue gas treatment system via the flue gas main pipe for heat recovery, a coal gas inlet of any one of the coal gas preheaters is connected to the coal gas main pipe, and the coal gas outlet of any one of the coal gas preheaters is connected to the gas inlets at the bottom of the primary riser, the secondary riser and the tertiary riser, respectively.

2. A method of reducing powdery iron ore on a fluidized bed in a system according to claim 1, the method comprising: causing a powdery iron ore and a gas to enter into and pass through the system simultaneously in the following way: the powdery iron ore enters into the second cyclone separator, the third cyclone separator and the first cyclone separator from the bin via the screw feeder, and then enters into the bubbling fluidized bed body via the feeder; after being discharged from an upper feed outlet of the bubbling fluidized bed body, the powdery iron ore enters into the primary riser of the primary circulating fluidized bed via the primary feeder, and is discharged via the fourth cyclone separator and the primary circulating dipleg, and enters into the secondary riser of the secondary circulating fluidized bed, while powder collected by the fifth cyclone separator also enters into the secondary riser of the secondary circulating fluidized bed via the secondary feeder; then powder in the secondary riser is discharged via the sixth cyclone separator and the secondary circulating dipleg and enters into the tertiary riser of the tertiary circulating fluidized bed, while powder collected by the seventh cyclone separator also enters into the tertiary riser of the tertiary circulating fluidized bed via the tertiary feeder; a reduction powder product of the tertiary circulating fluidized bed is discharged via the eighth cyclone separator and the tertiary circulating dipleg and enters into the product bin, while powder product collected by the ninth cyclone separator also enters into the product bin via the discharger; the coal gas enters into the primary riser, the secondary riser and the tertiary riser, respectively, to contact with the ore powder for reduction after being preheated by the primary coal gas preheater, the secondary coal gas preheater and the tertiary coal gas preheater; in the meantime, the coal gas enters into the reducing system through the corresponding gas inlets at the bottom of the feeder, the primary feeder, the primary circulating dipleg, the secondary feeder, the secondary circulating dipleg, the tertiary feeder, the tertiary circulating dipleg and the discharger, via the respective pipelines; a gas discharged by the primary riser is subjected to powder removing treatment by the fourth cyclone separator and the fifth cyclone separator, then enters into the pipeline burner where the gas is partially burned with air from the air main pipe so that the temperature of the gas increases, and then enters into the bubbling fluidized bed body to contact with the ore powder resulting in pre-reduction of the ore powder; a gas discharged by the bubbling fluidized bed body enters into the reduction exhaust gas treatment system via the pipeline after exchanging heat with the powdery iron ore through the first cyclone separator, the second cyclone separator and the third cyclone separator; a gas discharged by the secondary riser enters into the reduction exhaust gas treatment system via the pipeline after being subjected to powder removing treatment by the sixth cyclone separator and the seventh cyclone separator; a gas discharged by the tertiary riser enters into the reduction exhaust gas treatment system via the pipeline after being subjected to powder removing treatment by the eighth cyclone separator and the ninth cyclone separator; and the coal gas and air enter into the primary coal gas preheater, the secondary coal gas preheater and the tertiary coal gas preheater via the nozzle resulting in combustion which generates heat used for preheating the coal gas, and then enter into the flue gas treatment system via a flue gas treatment system connecting pipeline.

3. The method of reduction according to claim 2, wherein the bubbling fluidized bed comprises a horizontal multi-compartment bubbling fluidized bed.

4. The method of reduction according to claim 2, wherein the pre-reduction comprises reducing the powdery iron ore to ferrous oxide, and the pre-reduction is carried out at 650-750° C. for 20-70 minutes.

5. The method of reduction according to claim 2, wherein the reducing coal gas is preheated to a high temperature of 850-950° C. by the primary coal gas preheater, the secondary coal gas preheater and the tertiary coal gas preheater, respectively.

6. The method of reduction according to claim 2, wherein any one of the primary circulating fluidized bed, the secondary circulating fluidized bed and the tertiary circulating fluidized bed is operated at a high gas velocity of 5-10 m/s.

7. The method of reduction according to claim 2, wherein the method of reducing is carried out at 800-900° C. for 30-70 minutes.

8. The method of reduction according to claim 2, wherein the method of reducing is carried out at a low pressure, which is an operating pressure of less than 1 atm.

* * * * *